(12) United States Patent
Aharoni

(10) Patent No.: US 7,957,006 B2
(45) Date of Patent: Jun. 7, 2011

(54) SYSTEM AND METHOD FOR OPTICAL SENSING OF SURFACE MOTIONS

(76) Inventor: Avraham Aharoni, Rehovot (IL)

( * ) Notice: Subject to any disclaimer, the term of this patent is extended or adjusted under 35 U.S.C. 154(b) by 311 days.

(21) Appl. No.: 12/240,360

(22) Filed: Sep. 29, 2008

(65) Prior Publication Data

US 2009/0025480 A1    Jan. 29, 2009

Related U.S. Application Data

(63) Continuation-in-part of application No. PCT/IL2007/000406, filed on Mar. 29, 2007.

(30) Foreign Application Priority Data

Apr. 2, 2006 (IL) .......................................... 174713

(51) Int. Cl.
*G01B 11/02* (2006.01)
(52) U.S. Cl. ...................................................... 356/502
(58) Field of Classification Search .................... 356/502
See application file for complete search history.

(56) References Cited

U.S. PATENT DOCUMENTS

| | | | |
|---|---|---|---|
| 3,700,903 A | 10/1972 | Adler et al. | |
| 5,585,921 A * | 12/1996 | Pepper et al. | 356/487 |
| 2005/0210982 A1 | 9/2005 | Pepper et al. | |
| 2009/0027688 A1 * | 1/2009 | Pouet | 356/502 |

FOREIGN PATENT DOCUMENTS

| | | |
|---|---|---|
| GB | 2052048 | 1/1981 |
| JP | 5-141965 | 6/1993 |
| WO | WO 86/06845 | 11/1986 |
| WO | WO 03/089955 | 10/2003 |

OTHER PUBLICATIONS

International Search Report for PCT/IL2007/000406 dated Aug. 3, 2007.

* cited by examiner

*Primary Examiner* — Michael A Lyons
(74) *Attorney, Agent, or Firm* — Kilpatrick Townsend & Stockton, LLP (57) ABSTRACT

There is provided an optical perturbation sensing system, including a probing beam incident on a medium, a sensing beam redirected from the medium and incident on a surface area of a photodetector, an array of photodetector elements, and a constructive combiner for constructively combining detected signals from the elements, to form a stronger detected signal. A method for detection of perturbations in a medium is also provided. The invention avoids the need for detection of the phase or the frequency variations of the scattered signal as used in the more complex hitherto-proposed approaches.

23 Claims, 10 Drawing Sheets

SYSTEM AND METHOD FOR OPTICAL SENSING OF SURFACE MOTIONS

RELATED APPLICATION

This application is a continuation-in-part of PCT/IL2007/000406 filed Mar. 29, 2007, which claims priority to Israeli application 174713 filed Apr. 2, 2006.

FIELD OF THE INVENTION

The present invention relates to a system and a method for optical sensing of surface motions, and in particular, to optical sensing of vibrations on rough surfaces.

BACKGROUND OF THE INVENTION

Optical sensing of mechanical vibrations is a subject of interest in a variety of fields for many different applications. Optical vibration sensors are used to detect ultrasonic signals in different non-contact inspection of vibrating surfaces, non-destructive testing of engineering products, for non-invasive monitoring of medical parameters, for a variety of scientific investigation of delicate or inaccessible materials and devices, and for other purposes. Optical detection methods offer many advantages, in particular, non-contact, wide-bandwidth and high sensitivity. Optical detection methods, however, suffer from high sensitivity to environmental effects, such as instability and vibrations in the test arrangement and temperature variations. A further difficulty relates to detection of vibrations of optically scattering surfaces or media. The scattering introduces a strong modulation of the wavefronts of the optical probing beams which, in many cases, randomize the signal components that average out to generate very poor signal-to-noise ratios. Different methods have been devised to overcome the effects of such scattering, including Fabry-Perot interferometry, real-time holographic interferometry, phase conjugation of the scattering waves and various methods for time-domain or spatial domain filtering of the scattering effects. All of these methods are complex, often require careful setup or calibration procedures, involve quite cumbersome sensing components, and are by and large relatively expensive.

Figures 1A, 1B:
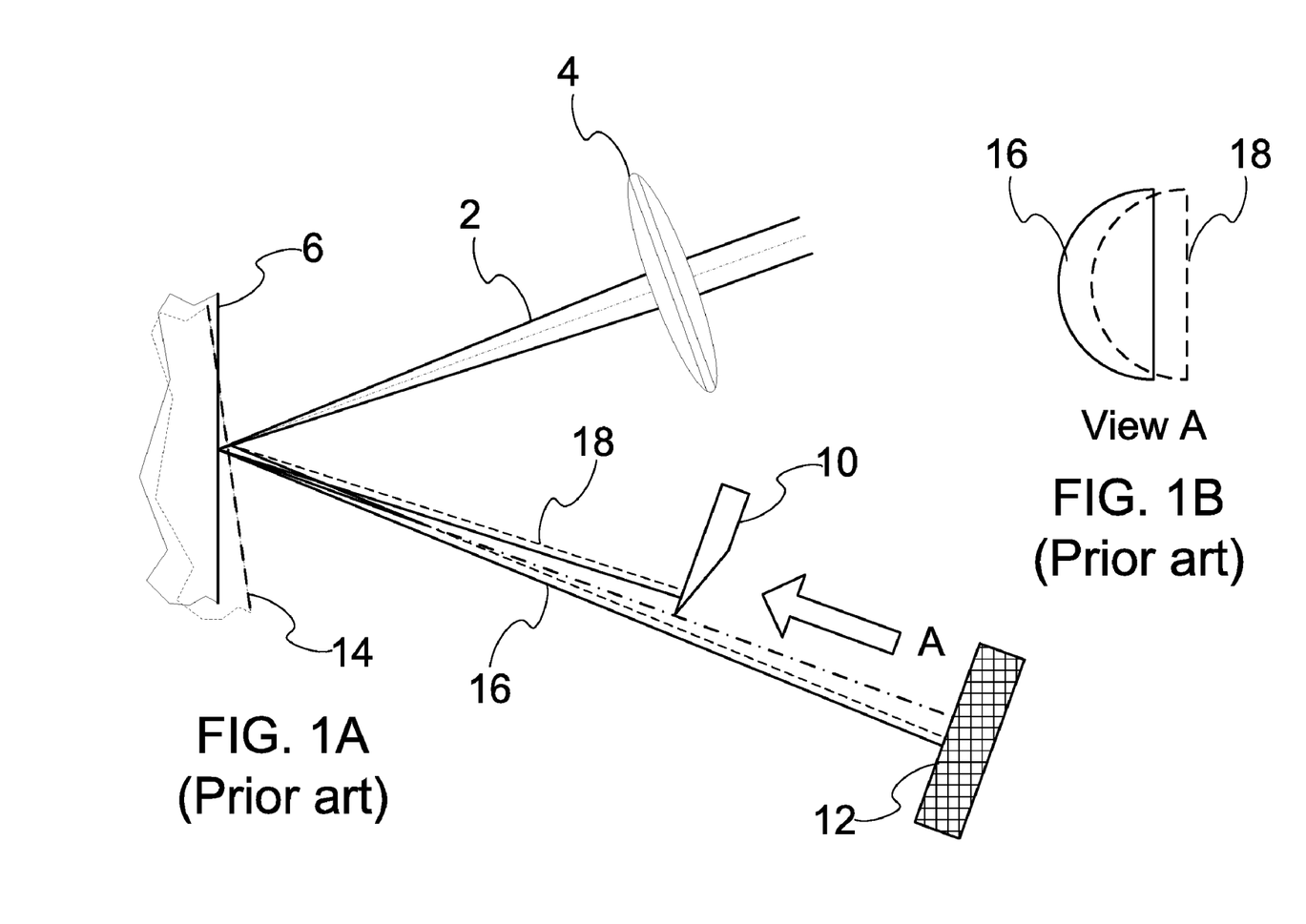
FIG. 1A is an illustration of the prior art knife-edge technique for optical sensing of surface perturbations.
FIG. 1B is an illustration of a pattern of reflected beams of FIG. 1A.

FIG. 1A schematically illustrates the per-se known knife-edge technique (KET) for detecting surface perturbations. A collimated probing light beam 2 is typically focused by a lens 4 onto a small spot on the surface 6, of interest. The reflected beam 2 is partially blocked with a knife-edge 10 and is incident on a photo-detector 12. Perturbation of the surface 6 to a new location 14 shifts the redirected or reflected beam 16 to a new location 18, as indicated by the broken line in FIG. 1A. Such shift necessarily modifies the portion of the beam 16 blocked by the knife-edge 10. Schematically illustrated in FIG. 1B is the portion of the original, unperturbed, beam 16 passing the knife-edge 10 and the location 18 of the reflected beam 16 when the surface is perturbed. Consequently, there is a change in the total intensity incident on the photodetector 12. In other words, perturbation of the surface 6, introduces a corresponding variation in the light intensity reaching the photodetector 12, which generates a corresponding electronic signal. Once in the electronic phase, the signal is amplified and presented on a suitable display or input to a processor (not shown).

While FIG. 1A presents detection of perturbation in the position of a surface reflecting the probing beam, the KET is equally suitable for detecting perturbations in the propagation direction of the probing light beam through bulk transparent media, i.e., variations in a refractive index due to variation in air pressure in a wind tunnel, and refractive index modulation due to acoustic waves.

The KET is used for a variety of probing beam perturbations, such as detection of vibrations of surfaces, detecting acoustic and ultrasonic waves and detection of dynamic variations in a refractive index in transparent media. This technique is, however, essentially limited to specular or nearly specular surfaces in the reflection mode, or non-scattering media in the transmission mode. When applied to a rough surface, the probing beam is scattered generating an irregular pattern in the plane of the knife-edge and on the photodetector. In general, such patterns have irregular intensity and phase variations. Consequently, when the surface moves and perturbs the reflected beam, the intensity and phase of the generated pattern are disturbed in an irregular fashion. For example, the intensity in some areas increases, while in other regions, it may decrease. Similarly, the phase may increase in some areas but decrease in others. As the photodetector integrates these changes, which become randomly self-canceling, a very low overall signal, which may even be indiscernible, results.

In the interest of brevity, the description in the following is limited to surface reflection configurations straightforwardly extended to the case of detection of perturbation-in-bulk, in transmission.

Figures 2A, 2B:
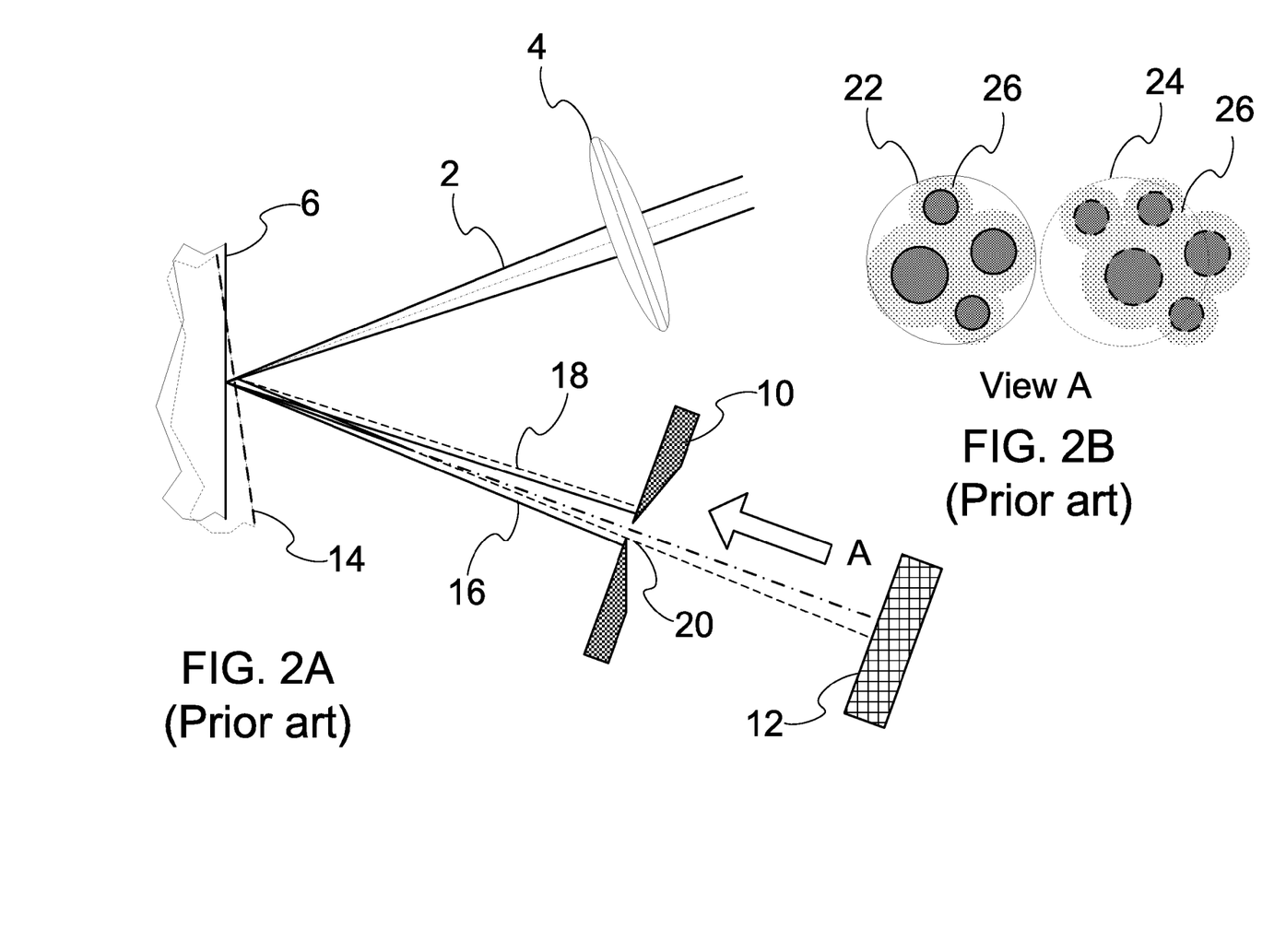
FIG. 2A is an illustration of a prior art modification of the knife-edge technique of FIG. 1A, as applied to a speckled wavefront.
FIG. 2B is an illustration of the pattern of transmitted and reflected beams of FIG. 2A.

FIG. 2A schematically illustrates a known approach to overcome the problem of random variation of the light pattern reflected off a rough surface. A probing beam 2 is focused to a small spot on the surface 6 by a lens 4. To counter the effect of the random nature of the reflected pattern, an aperture 20, e.g., an aperture in a knife-edge disk, is introduced. The diameter of the aperture 20 is chosen to be in the order of the reflected pattern variation period, so that a small number of pattern "spots" 22 (FIG. 2B) is allowed to pass through the aperture 20 and reach the photodetector 12. In this case, the small number of spots 22 reduces the irregularity of the intensity and phase variations within the reflected pattern. Therefore, when the pattern is perturbed by a shift of the original surface 6 to a different position 14, the overall summed signal is still appreciable, even if some of the contributions are of opposite signs.

The embodiment illustrated in FIGS. 2A and 2B may present some difficulties, as follows:

1. The choice of a suitable aperture 20 will depend on the characteristics of the surface roughness, i.e., the longer the characteristic spatial wavelength of the roughness, the larger an aperture 20 would be required for optimal performance. Indeed if the aperture 20 is too small, so as to pass only a portion of a "spot", the detected signal will be very weak;
2. Even though a small number of components 26 is detected, the components are still partially self-canceling, and thus, the overall signal reduces with respect to detection on a specular surface, and
3. Typically, a small aperture 20 is required in highly scattering surfaces; the resulting overall light intensity that reaches the detector 12 will therefore also be small, thereby introducing a practical difficulty of detecting relatively low light levels.

GB 2 052 048 corresponding to U.S. Pat. No. 4,275,963 discloses a method and system for sensing acoustic energy responsive deformation of a workpiece surface in a contact-free manner by optical means using a multi-wavelength laser which illuminates the surface at which deformation is expected. The reflection light energy is transmitted to an optical interferometer and thereafter separated into the distinct wavelengths. Each light signal corresponding to a specific wavelength is converted to an electrical signal, which is rectified, and averaged.

WO 03/089955 discloses an apparatus and method for identifying a remote target illuminated with radiation generated by a laser. The light scattered by the target is modulated in phase by the surface vibrations of the target. A portion of the scattered radiation is collected by multiple optical receivers and demodulated by a phase demodulator to generate a signal proportional to the vibrational displacement of the remote target. The radiation scattered by the remote target will also include laser 'speckle', generated when radiation is scattered by a rough solid surface. This speckle can generate errors in the signal demodulated, which can in turn cause identification errors.

As further explained on page 5, lines 12ff signal light from the target surface is mixed with light from a frequency shifter, resulting in optical interference, which gives rise to intensity modulation that is detected by different photodiodes.

WO 86/06845 discloses a laser velocimeter for measuring the relative speed of a surface and a source of coherent light directed thereto comprising optical and electrical means for generating two electrical signals one of which corresponds to the content of the speckle pattern produced by illumination of the surface for obtaining a difference signal from the two electrical signals. The centre frequency of the signal spectrum of the difference signal is determined to generate an electrical signal indicative of the relative velocity of the surface and source.

US20050210982 discloses laser vibrometers for detecting surface vibrations of a remote mass excited with one or more beams. Each vibrometer generates a signal indicative of the surface vibrations which is stored, reversed in time, and applied to phase modulate an exciter beam that is then impinged onto the mass.

The present invention proposes the use of simple, low-cost, compact components and offers both high sensitivity and good immunity from environmental effects.

SUMMARY OF THE INVENTION

In accordance with the present invention there is provided an optical perturbation sensing system, comprising a probing beam incident on a medium, a sensing beam redirected from said medium and incident on a surface area of a photodetector, an array of photodetector elements, and a constructive combiner for constructively combining detected signals from said elements, to form a stronger detected signal.

The invention further provides a method for detection of perturbations in a medium, comprising generating a probing beam, propagating said beam through a medium, sensing the beam transmitted through said medium and directing it on a photodetector, segmenting said photodetector into an array of elements, detecting signals from each element, rectifying said detected signals, and summing up said rectified signals to an overall stronger detection signal.

The invention can be implemented to advantage in a variety of applications for optical sensing of vibrations, acoustic waves and ultrasound. In such applications, the invention allows detection even when the test surface is rough or within scattering media. The invention requires low cost components and is relatively insensitive to environmental effects that severely affect other optical detection methods. Some embodiments of the invention are also capable of detecting tilting vibrations in two coordinates, a feature that is invaluable in certain situations.

BRIEF DESCRIPTION OF THE DRAWINGS

The invention is described in connection with certain preferred embodiments, with reference to the following illustrative figures so that it may be more fully understood.

With specific reference to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention. The description taken with the drawings are to serve as direction to those skilled in the art as to how the several forms of the invention may be embodied in practice.

In the drawings.

DETAILED DESCRIPTION OF EMBODIMENTS

Figures 3A, 3B, 3C:
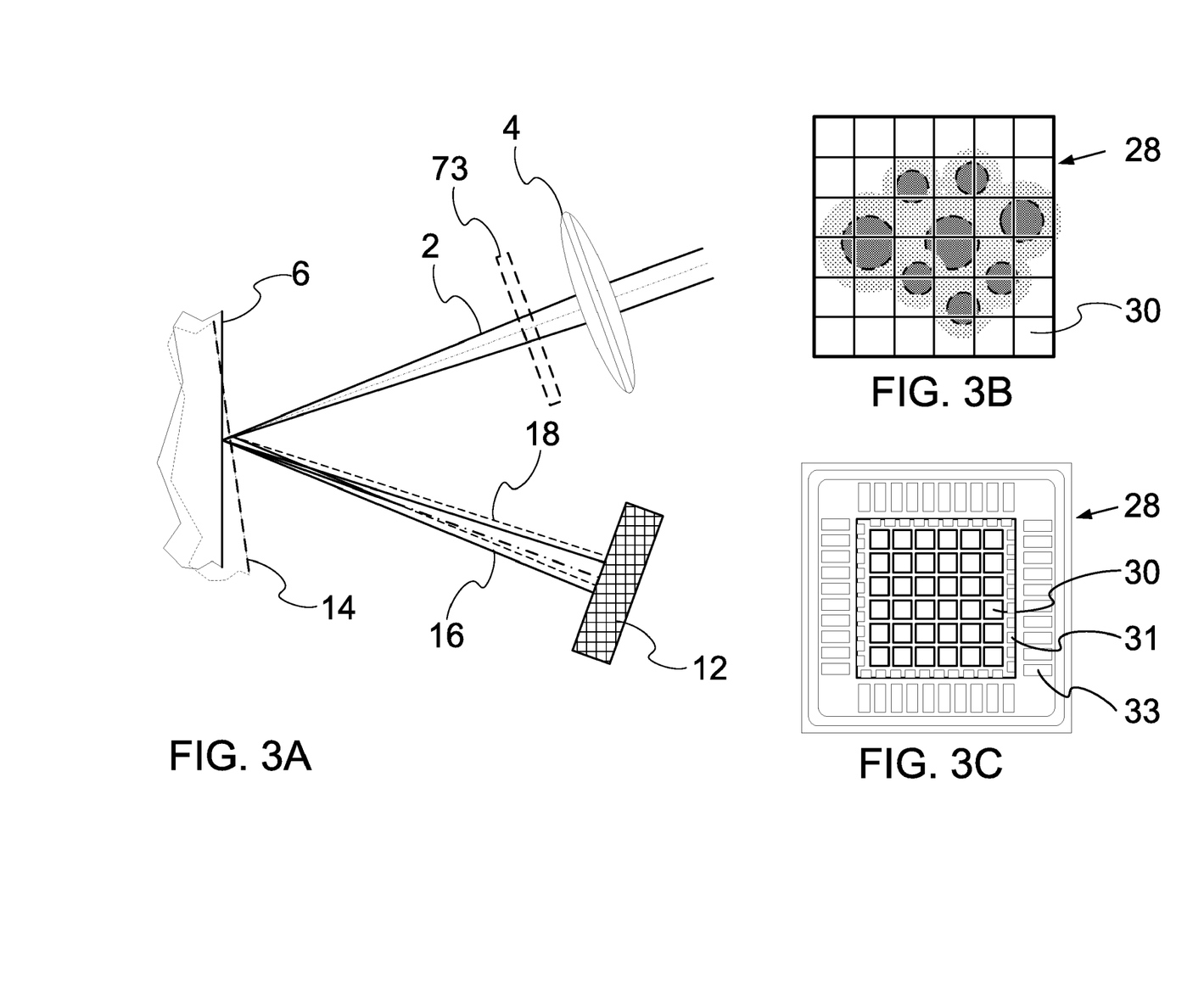
FIG. 3A is a schematic illustration of an optical sensing system, according to the present invention.
FIG. 3B is a schematic illustration of an illumination pattern on a detector.
FIG. 3C is a schematic illustration of a preferred embodiment of a photodetector array.

The proposed detection system shown in FIGS. 3A and 3B utilizes a probing beam 2, focused by a lens 4 to a spot on the surface 6, as in the classical KET. Instead of a knife-edge, or an aperture, however, the proposed system incorporates a detector array 28 (FIG. 3B). This array 28 may be made integrally with the photodetector 12 or placed directly in the path of the reflected beam 16 or in combination with a light-collecting lens (not shown in FIG. 3A). The elements 30 of the detector array 28 serve as small apertures designed to detect a small portion of the reflected pattern.

FIG. 3C illustrates the construction of a preferred embodiment of a photodetector array suitable for advantageously implementing in the present invention. The array 28 is preferably formed from a single semiconductor wafer. The individual elements 30 of the array may be formed by etching the semiconductor material. Alternatively, the array may be implemented as an assembly of individual detecting elements to form an array of detectors. Any number of detecting elements of different sizes and different shapes are possible. This embodiment shows a 6×6 array, each of approximately 1 mm$^2$ with a pitch of some 1.2 mm. Suitable electrical contacts 31 are etched on the same semiconductor wafer. The wafer is mounted onto a suitable substrate and the semiconductor contacts 31 are electronically connected to suitable contact pads 33 on the substrate. Typically, wire-bonding can be employed for the electronic contacts. Other bonding methods can also be used. The array 28 can either be mounted in this format onto a hybrid circuit substrate, or packaged in a standard electronic enclosure, such as SMT, BGA, DIP or round metal casings. Alternative methods of assembly are also possible, including the mounting of individual photodetector elements to form a similar overall array.

As in the perturbed reflected beam 18, some of the detector elements 30 detect an increase in the intensity, some a decrease, so that in many cases, the signal may be cancelled out altogether. Nevertheless, as these detector elements 30 can now be used to generate independent signal contributions, the contribution from each detection region can be used to add constructively to a larger signal. Several different approaches to such processes, implemented with electronics, are described in the following. Deploying such differential detection, necessarily cancels common-mode signals reaching the photodetector array. Disturbances introduced by external illumination, such as noise from fluorescent lamp switching, or low frequency noise in incandescent lamps, is eliminated altogether by this approach.

Figure 4:
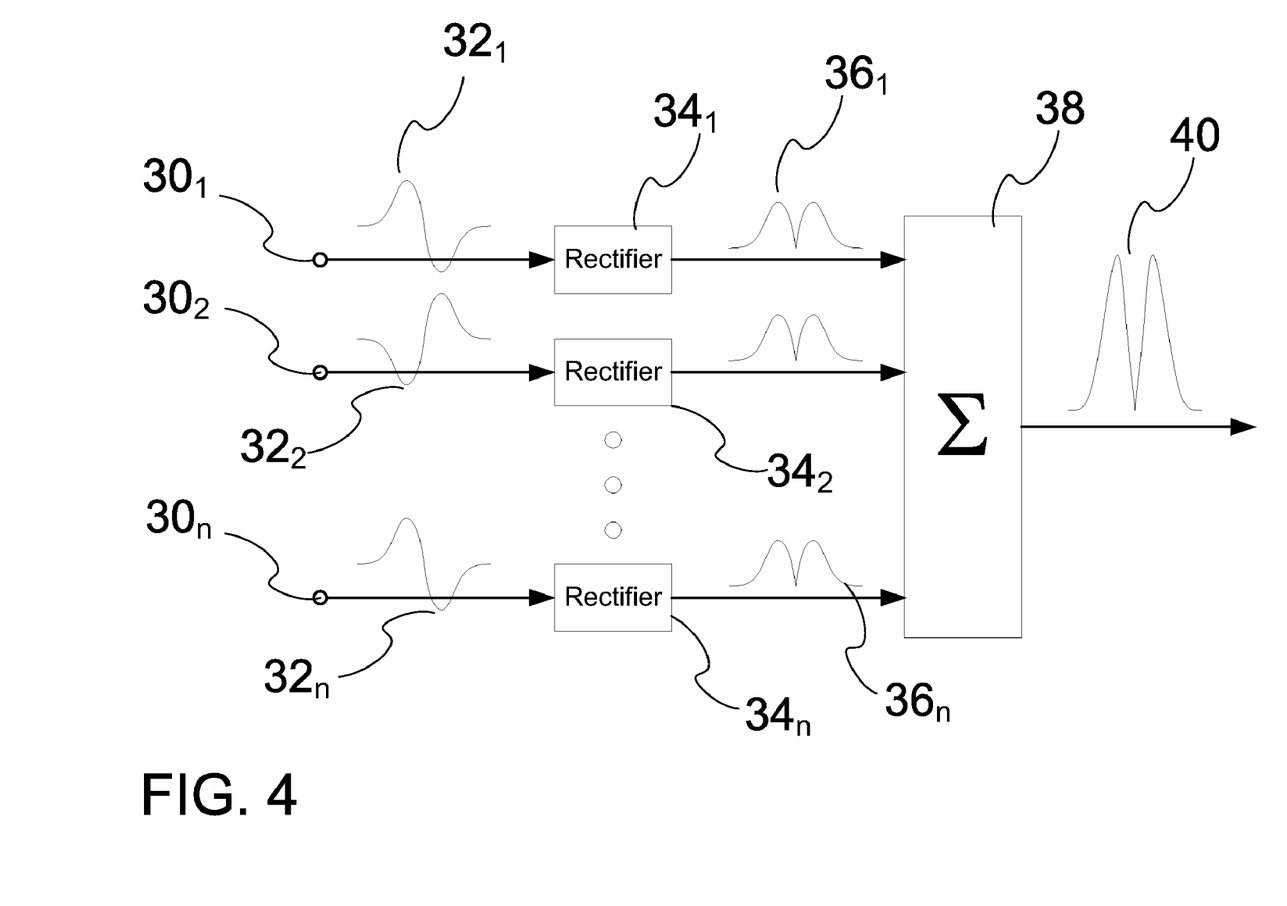
FIG. 4 is a schematic illustration of an embodiment of a signal processing technique utilizable by the present invention.

FIG. 4 schematically illustrates a detection technique according to the present invention. The signals $32_1$ to $32_n$ from each detector element $30_1$ to $30_n$ are picked up electronically, so that some elements (for example $30_1$) will show a positive signal component, while others (for example $30_2$), a negative signal component. If all these signals are summed up, the overall detected signal will cancel out. Here, however, the signals are first rectified with a series of rectifiers $34_1$ to $34_n$. The rectified signals $36_1$ to $36_n$ are now summed up constructively with a summer 38 to obtain a strong signal 40. The resulting signal can be used in its rectified form for detection application. In cases where the original surface perturbations should be reproduced with fidelity, the rectified signal requires transformation into the original bipolar form. This can be accomplished with various algorithms, subject to an ambiguity in the sign of the signal.

Figure 5:
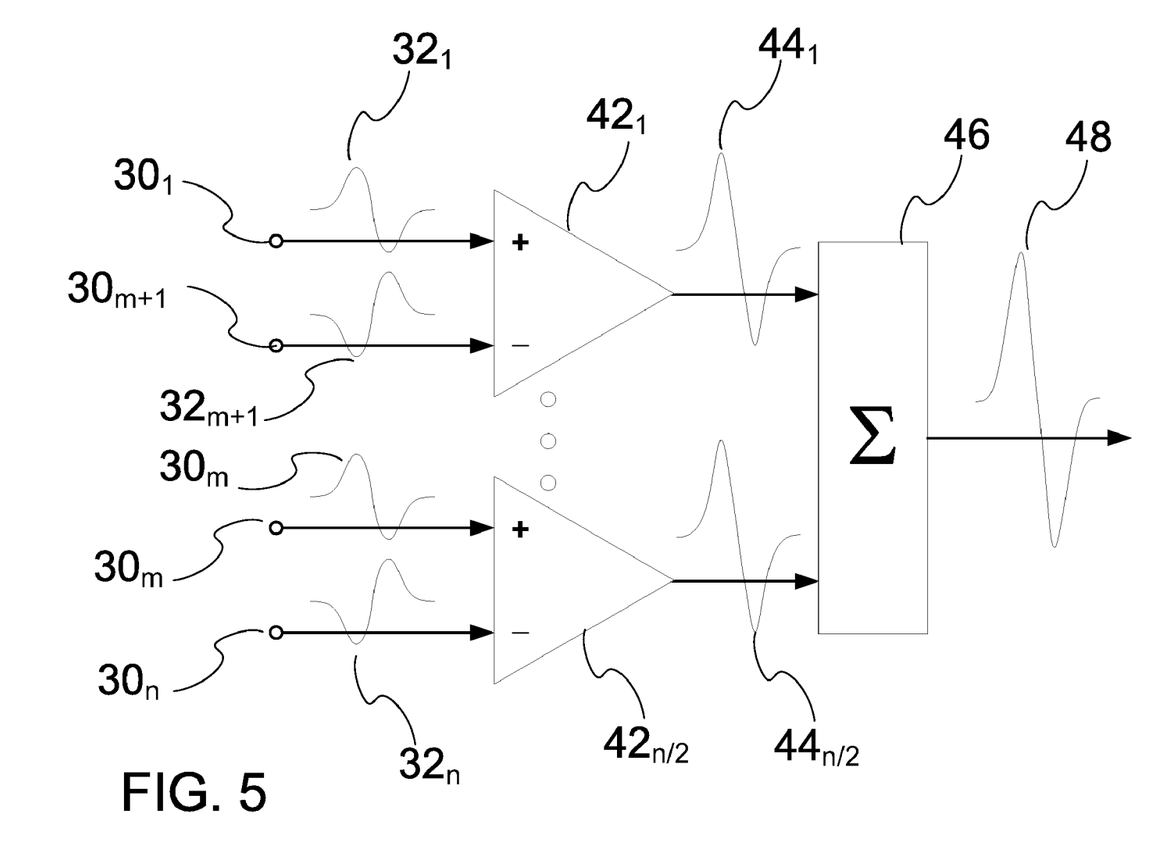
FIG. 5 is a schematic illustration of a further embodiment of a signal processing technique utilizable by the present invention.

FIG. 5 schematically illustrates an alternative detection arrangement according to the present invention. The signals $32_1$ to $32_n$ from each detector elements $30_1$ to $30_n$ are picked up electronically; elements $30_1$ to $30_n$ are grouped in two, i.e., those with positive signals $32_1$ to $32_m$ and those with negative signals $30_{m+1}$ to $30_n$, and paired such that positive signals are fed to the positive port of a differential amplifier $42_1$ to $42_{n/2}$, and the negative signals are fed to the negative port of the same amplifier $42_1$ to $42_{n/2}$. The resulting signal of each positive and negative pair re-enforce each other, resulting in a higher intensity signal 44. The contribution from each signal pair can then be summed up with a summer 46 to obtain a strong signal 48. The resulting signal 48 replicates the form of the original surface perturbations, with no sign ambiguity. When there is an unequal number of positive and negative signal elements (or in the notation above m≠n/2), some of the differential amplifiers can be fed with only one signal, positive or negative, while the second input of the amplifier $42_1$ to $42_n$, is grounded.

Figure 6A:
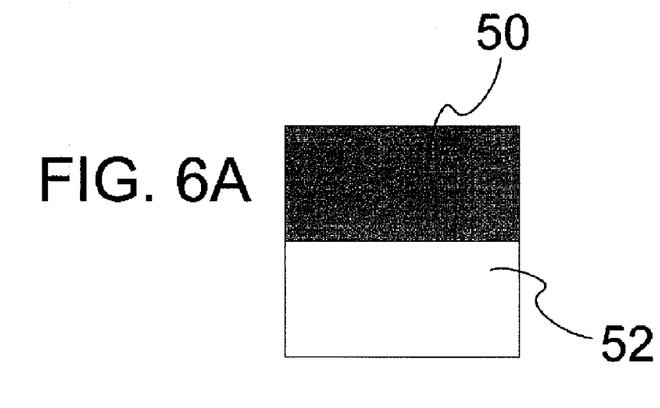
FIGS. 6A, 6B, 6C and 6D illustrate different grouping arrangements of the detector elements for use in detection schemes implemented by the present invention.
Figure 6B:
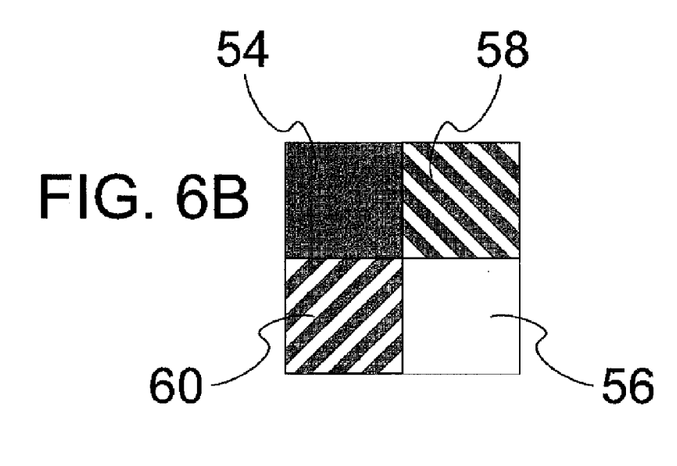

The choice of grouping of positive and negative signals depends on the degree of roughness of the surface and the required signal sensitivity. Some examples of groupings of elements are shown in FIGS. 6A through 6D. FIG. 6A shows groupings of the elements so as to replicate the classical KET. Half of the active elements, located in a region 50 above the center of the detector 12 are connected to the positive ports of the amplifier $42_1$ to $42_n$; the elements in the lower half region 52 of the detector 12 are connected to the negative ports of the amplifiers $42_1$ to $42_n$. The detector 12 is centered on the reflected beam (18 in FIG. 3A), so that each half of the photo-detector 12 acts as if it were a full photodetector blocked by a knife edge at its center. Subtracting the signals of the two regions 50, 52 results in a signal approximately twice as strong as that of the classical KET. In this case, the detector 12 is sensitive to vertical perturbation, as well as tilting of the surface 6 in an axis parallel to the boundary line between the positive and the negative regions 50 and 52, respectively. An extension of this embodiment, making it sensitive to surface tilting in two axes, is possible by utilizing only two quadrants of the detector's active area, as shown in FIG. 6B. For example, the top left quadrant 54 can be used for the positive signals and the lower right quadrant 56 for the negative signals. Here, a tilt around an axis parallel to the horizontal pattern boundary line generates a positive signal in the upper quadrant 54 and a negative signal in the lower quadrant 56. Similarly a tilt about an axis parallel to the vertical pattern boundary line generates a positive signal in the left hand quadrant 54 and a negative signal in the right hand quadrant 56 (and vertical perturbations of the surface affects both the above channels in a similar manner). In such an arrangement, however, the overall signal is proportional to the combined tilting in both axes and the vertical perturbation. Indeed, self-cancelling tilting patterns are possible, for example, a tilt about a horizontal axis such that a positive signal is generated in the quadrant 54 in combination with a tilt about a vertical axis that generates a negative signal in the same quadrant.

Figure 7:
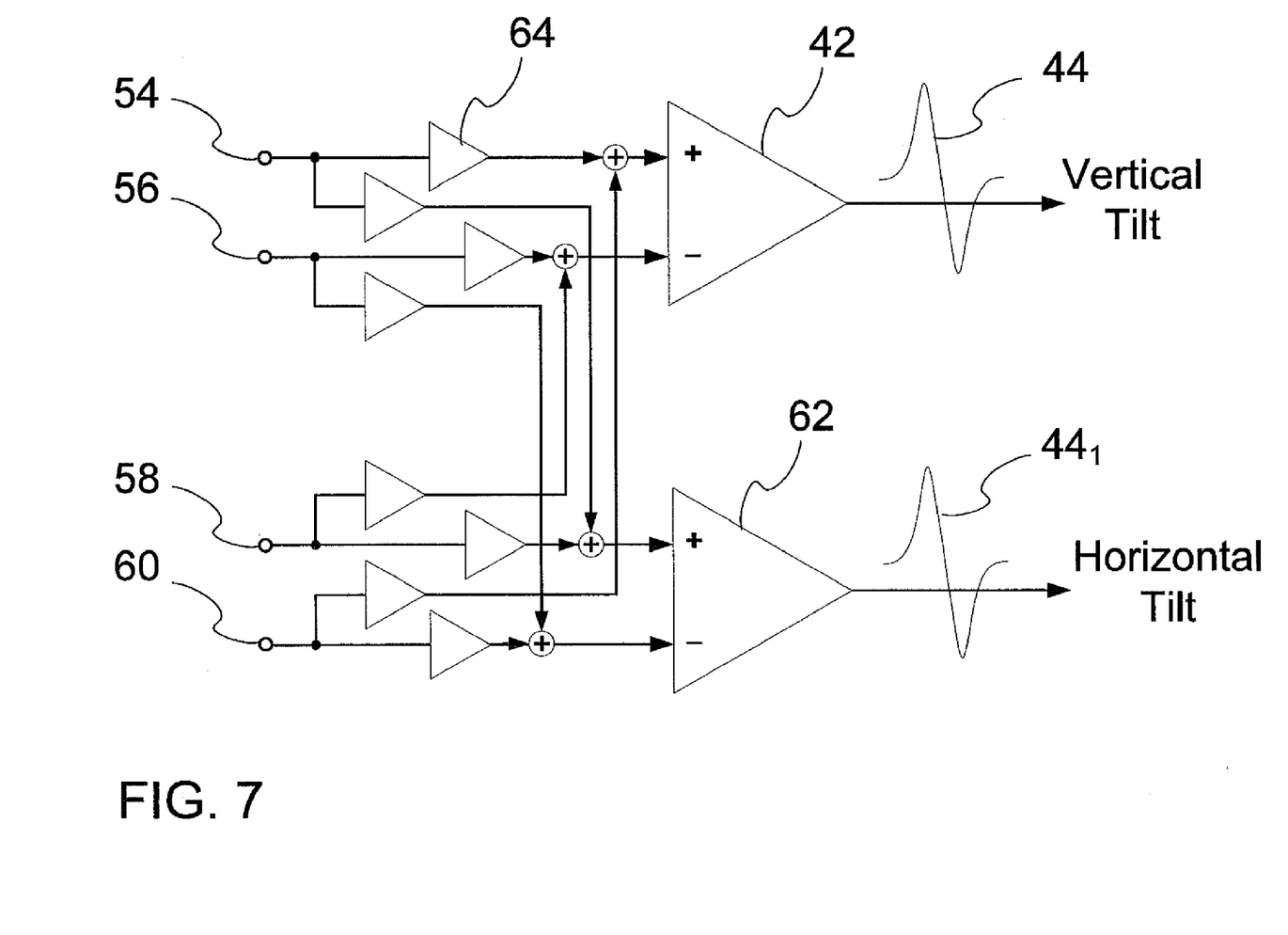
FIG. 7 is an illustration of a further embodiment of a signal processing technique also utilizable by the present invention, affecting independent signals for two orthogonal components of the surface displacements.

An alternative to the latter arrangement is to provide two signal outputs for independent detection of tilting in the two orthogonal axes. Such an arrangement, where the device is sensitive to both tilt axes and generates two independent signals for each axis, can be implemented by using the top right quadrant 58 and the lower left quadrant 60, to augment the signals from the other two quadrants. Consequently, for sensitivity to tilt about a vertical axis, quadrants 54 and 60 are connected to the positive signal group, and quadrants 56 and 58 to the negative signal group. Conversely, for sensitivity to tilt about a horizontal axis quadrants 54 and 58 are connected to the positive signal group and quadrants 56 and 60 to the negative signal group. This connection can be accomplished in parallel, as shown in FIG. 7. The elements of quadrants 54 and 60 are combined to the positive port and regions 50 and quadrant 58 to the negative port of the vertical differential amplifier (42 in FIG. 7). The elements of regions 54 and quadrant 58 are combined in parallel to the positive port and quadrants 56 and 60 to the negative port of the horizontal differential amplifier (62 in FIG. 7). Buffers 64 are used to allow this connection in parallel.

Figure 6C:
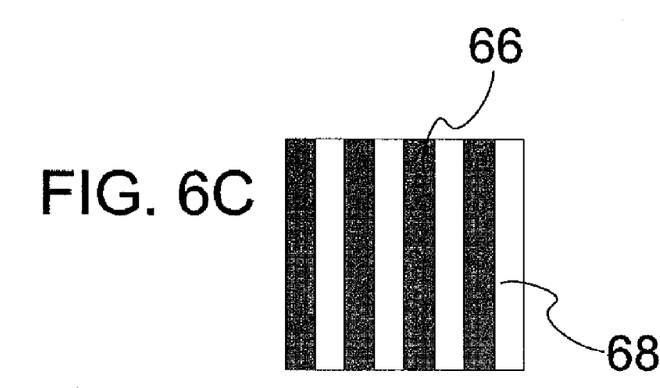

FIG. 6C shows a different grouping of the detector elements that is suitable for a one-dimensional detection of tilt for a rough surface or a linear surface perturbation. The "positive" region 66 and the "negative" region 68 are grouped so as to form vertical strips of a width comparable to the scattered "spots" on the detector. The tilting shifts the pattern across each strip and the signal is obtained as the intensity across the strip varies as in the case of the apertured embodiment of the KET of FIGS. 2A and 2B.

Figure 6D:
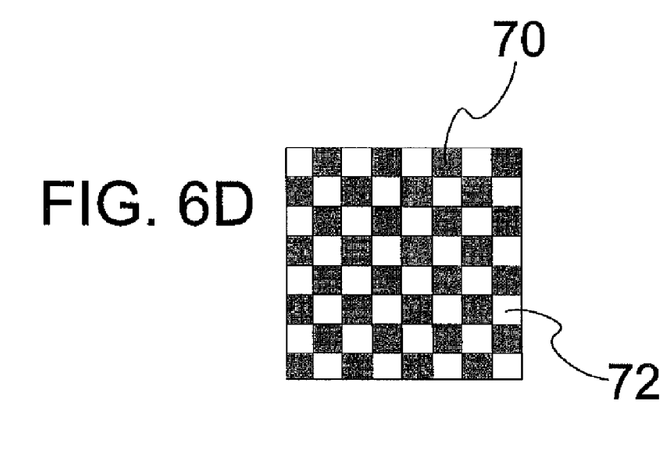

FIG. 6D shows a further grouping configuration that is sensitive to tilting in the two directions. The grouping into "positive" and "negative" regions 70, 72 is similar to that described above for the case of FIG. 6B, except that now smaller "apertures" are affected to accommodate the "spots" in the reflected beam.

There are many possible combinations to grouping the detection elements. This can be done with "hard-wired" electronics, as suggested with reference to the embodiments of FIGS. 4, 5 and 7, or through analog switching of the detection elements to different positive or negative ports. If an analog switching array is provided, the detection grouping can be assigned dynamically in a manner that adaptively maximizes the detected signal. In general, the signals for each element can be monitored and categorized to be connected to the "positive" or "negative" groups respectively. Additionally and alternatively, some of the elements not exceeding a present signal threshold, can be identified as not contributing to the overall signal and grouped into a "zero" group.

Figures 8A, 8B:
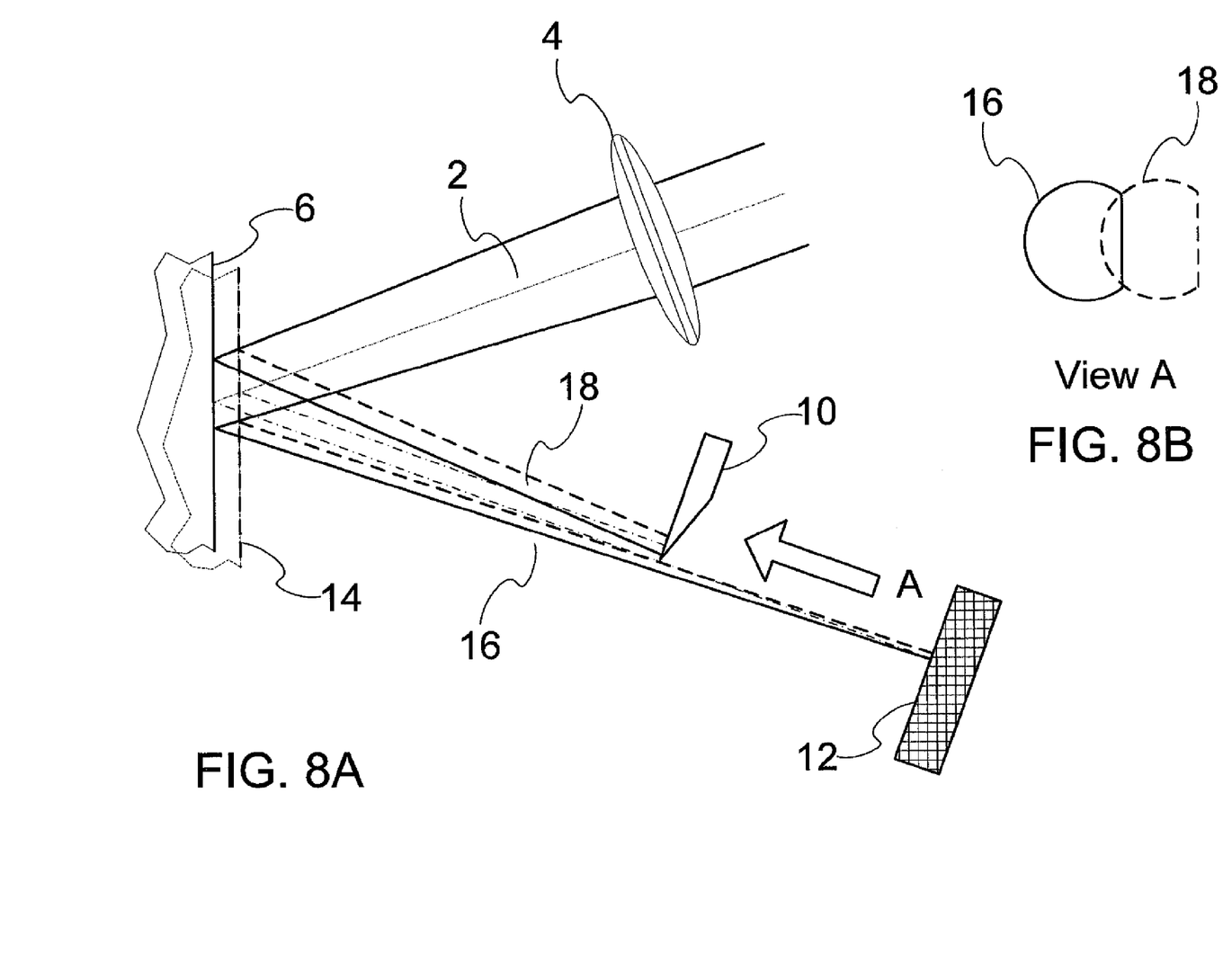
FIGS. 8A and 8B illustrate a further embodiment for optical sensing of vertical surface translation.

A further aspect of the current invention relates to the footprint of the illumination spot on the reflecting surface 6 in FIGS. 1A, 2A and 3A, the extent of the illuminated area on the surface 6 need not necessarily be small. In cases where the surface motion, tilt or vertical translation is uniform, the illumination footprint of the surface 14 can be optimized for light collection of the detector optics. When the surface perturbation is not uniform, such as is the case with a surface acoustic wave, the illumination footprint on the surface is optimally maintained smaller than half an acoustic wavelength. Moreover, for detection of surface vertical translation (FIG. 8A) the surface footprint can be maintained large and the beam arrangement made to focus onto the KET plane. This enhances the sensitivity to surface perturbation, namely, the spot size in the detection (the plane of the knife edge for KET, or plane of photodetector array for this invention) is small (FIG. 8B), so that the same surface perturbation introduces a larger percentile change in the intensity reaching the detector. This improvement applies equally for the classical KET and the current invention. The signal is approximately proportional to the ratio of the input beam diameter to the beam diameter at the detection plane. The geometry of the probing and reflected beams affect the sensitivity to surface tilt and surface translation differently. The surface tilt signal is inversely proportional to the beam divergence angle, so for optimal sensing of surface tilt a minimally diverging beam would be preferred, while, in contrast, for surface translation the signal is inversely proportional only to the beam diameter in the detection plane, so here a strongly converging beam is preferred.

In cases where the surface is rough, a large illumination footprint also makes the present invention sensitive to lateral translation of the surface. The probing beam redirected off the rough surface generates a speckle pattern. Disturbing the surface perturbs the speckle pattern and thereby generates an amplitude modulation in each of the detector elements. This amplitude modulation applies to surface tilting surface perturbation along the normal to the surface or lateral surface perturbation. This avoids the need for detection of either the phase or frequency variations of the scattered signal as used in hitherto-proposed approaches.

An additional aspect of the present invention and the ability to apply a large illumination footprint on the surface, relates to controlling the pattern of the reflected beam. This can be accomplished, e.g., by introducing a diffractive element shown as 73 in FIG. 3A in the probing beam (2 in FIG. 3A), so as to generate a diffracted pattern on the detector surface. For example, a pattern where the diffracted beam forms an array of "spots" of the size of each detection element and with similar pitch, can significantly enhance the signal.

The optimal choice for the incident beam angle is also different for optimal sensitivity to tilt and translation. While the detected signal for tilting perturbations is approximately insensitive to the probing beam incident angle, $\theta$, the signal intensity for a vertical motion of the surface 6 (to position 14 in FIG. 8A) is proportional to $\sin \theta$. For optimal sensitivity to vertical surface motion, a large incident angle $\theta$ is required. Similarly, lateral surface translation would be relate to $\cos \theta$.

Alternatively, high efficiencies of detection for surface vertical perturbations can be obtained by imaging the detection surface onto the photodetector array. As is the case of imaging planes, the imaged pattern replicates the lateral shifts on the surface, but becomes less sensitive to tilting. In this configuration there is also improvement in collection of light reflected from the surface under test.

Figure 9A:
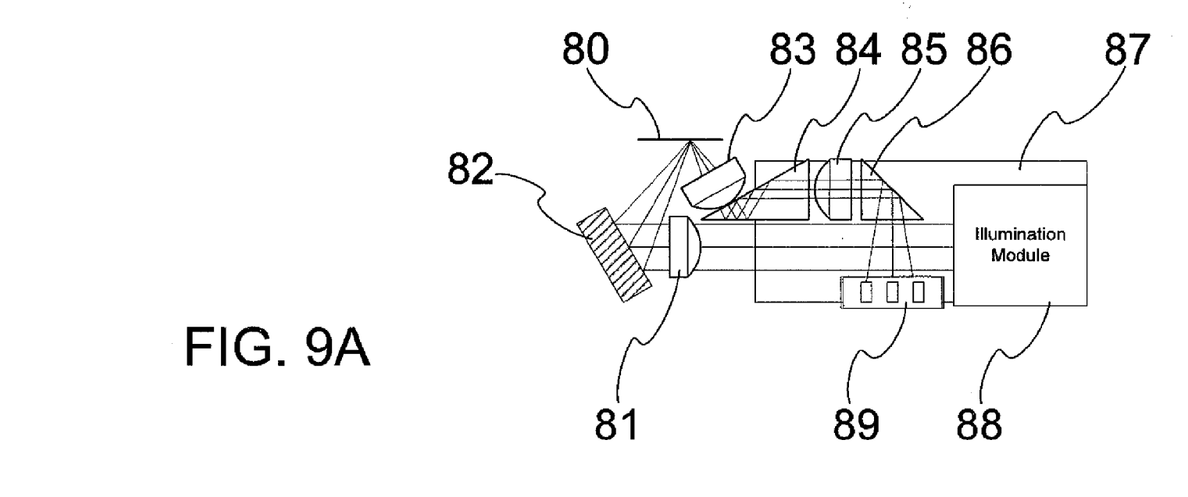
FIGS. 9A and 9B illustrate a further embodiment, based on standard components, for optical sensing of rough surface perturbations.
Figure 9B:
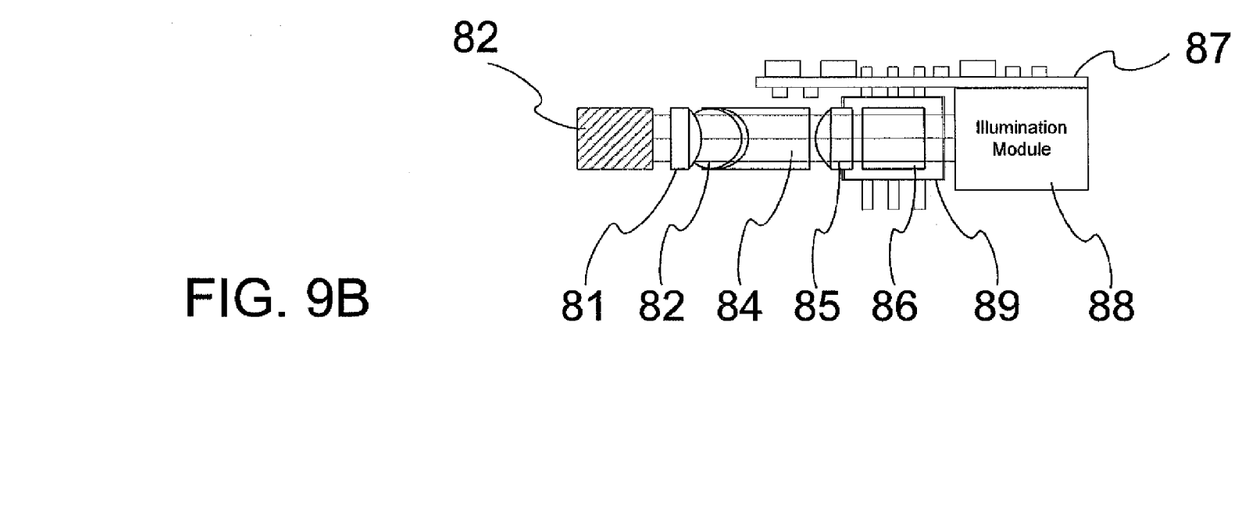

FIGS. 9A and 9B illustrate, respectively, the elevation and plan view of a compact embodiment for detection on rough surfaces. This embodiment takes advantage of standard, off-the shelf, components. The perturbed surface 80 is illuminated with light from an illumination source 88. The illumination is focused on the surface with focusing optics 81 and reflector 82. The light reflected from the surface is collected with lenses 83, 85 and folded with folding prisms 84 and 86, and directed onto a photodetector array 89. This embodiment also incorporates a printed circuit 87 that mounts the electronics components to operate the device.

Figure 10:
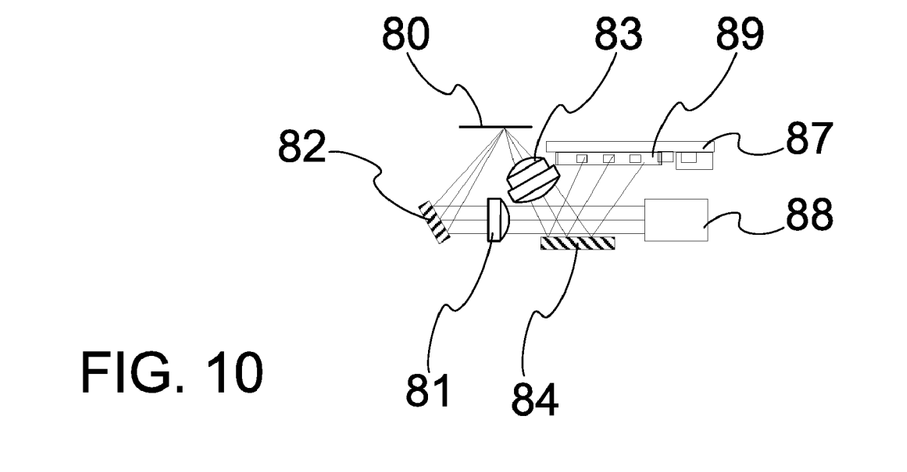
FIG. 10 illustrates a further embodiment for optical sensing of rough surface perturbations.

FIG. 10 illustrates a further compact embodiment for detection on rough surfaces. The perturbed surface 80 is illuminated with light from an illumination source 88. The illumination is focused on the surface with focusing optics 81 and reflector 82. The light reflected from the surface is collected with lens 83, folded with reflector 84, and directed onto a photodetector array 89. This embodiment also incorporates a printed circuit 87 that mounts the photodetector array 89 and electronics components, to operate the device.

Figure 11:
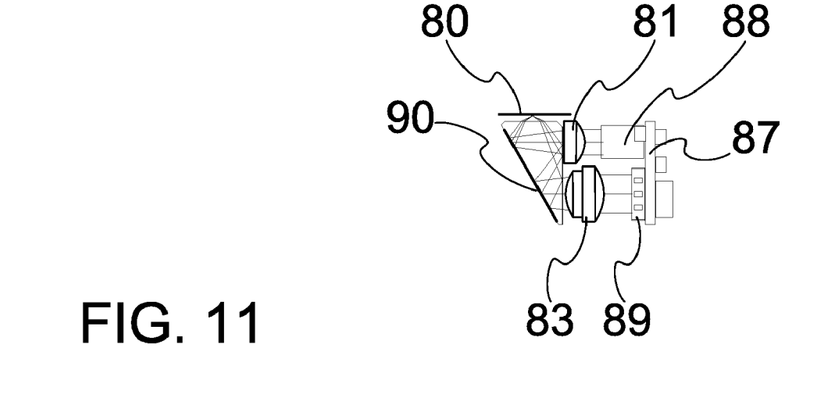
FIG. 11 illustrates a further compact embodiment for optical sensing of rough surface perturbations.

FIG. 11 illustrates a further compact mechanical embodiment for detection on rough surfaces. This embodiment takes advantage of the folding prism to achieve a compact design. The perturbed surface 80 is illuminated with light from an illumination source 88. The illumination is focused on the surface with focusing optics 81 and folded with the aid of a folding prism 90. The light reflected from the surface is folded through the folding prism 90 and collected with lens 83 and directed onto a photodetector array 89. The folding prism shown is a right angle prism with 30/60 degree corners and a reflective coating on its diagonal face. For a glass 30/60 prism with refractive index 1.5, the light is incident on the detection surface at approximately 50 degrees in air. Different air-incident angles can be implemented by changing the sharp angle of the prism, i.e., a 45 degree incidence in air can be affected with a prism angle of 32.5 degrees. The embodiment also incorporates a printed circuit 87 that mounts the illumination source 88, the photodetector array 89, and electronics components to operate the device.

It will thus be apparent that the invention provides a system and a method for optical sensing of surface perturbation, and in particular, to optical sensing of vibrations on rough surfaces without the need for detecting the phase or the frequency variations of the scattered signal as used in hitherto-proposed approaches. This results in a simpler system and method.

It will be evident to those skilled in the art that the invention is not limited to the details of the foregoing illustrated embodiments and that the present invention may be embodied in other specific forms without departing from scope of the attached claims. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An optical perturbation sensing system, comprising:
    an illumination source and optics for directing an incident probing beam on to a surface of a medium as in classical Knife Edge Technology;
    an array of photodetector elements for receiving respective components of the probing beam redirected by said surface, and
    a constructive combiner for constructively combining detected signals from said elements;
    wherein movement or disturbance of the medium perturbs the probing beam so as to change the amplitude of the respective components of the scattered beam received by each of the photodetector elements without needing to detect variations in either the phase or frequency of the scattered signal; and
    wherein the constructive combiner is adapted to sum respective amplitudes of the respective components to produce an enhanced detected signal.

2. The system as claimed in claim 1, wherein said medium is a surface redirecting the probing beam by reflection and scattering.

3. The system as claimed in claim 1, wherein the redirected sensing beam is imaged onto a surface of said photodetector.

4. The system as claimed in claim 1, wherein said constructive combiner comprises signal rectifiers and a summer.

5. The system as claimed in claim 1, wherein said probing beam and sensing beam are folded with reflections within a right-angle prism, at least one reflection of each beam being affected by total internal reflection.

6. The system as claimed in claim 1, wherein the probing beam is implemented with a broad footprint on said surface and a substantially narrow footprint on the photodetector surface so as to enhance the sensitivity to uniform surface perturbations.

7. The system as claimed in claim 1, wherein said probing beam is implemented with an internal structure using a diffraction element forming a pattern in the optical beam reaching the photodetector so as to enhance the sensitivity to uniform surface perturbations.

8. The system as claimed in claim 1, wherein the elements of the photodetector are grouped into positive signal elements and negative signal elements, and signals from each group are added separately and applied to a positive input and, respectively, a negative input of a differential amplifier.

9. The system as claimed in claim 8, wherein the positive and negative signal groups each substantially occupy half the photodetector surface area and wherein each of said groups is substantially contiguous.

10. The system as claimed in claim 9, wherein the boundary between the said positive and negative signal groups is substantially a straight line.

11. The system as claimed in claim 8, wherein the positive and negative signal groups each substantially occupy a quarter of the photodetector surface area and wherein each of said groups is substantially contiguous.

12. The system as claimed in claim 11, wherein the boundaries between said quarter surface areas are a straight line.

13. The system as claimed in claim 8, wherein the positive and negative signal groups each substantially occupy a quarter of the photodetector surface area and wherein no column or row of elements contain both signal groups.

14. The system as claimed in claim 8, wherein two sets of positive and negative signal groups are produced, and wherein each set of the positive and negative signal groups substantially occupy half the photodetector area;
    a first set of said positive and negative signal groups is formed with a straight boundary in a first attitude;
    a second set of said positive and negative signal groups is formed with a straight boundary substantially perpendicular to that of the first straight boundary;
    signals from said first set of positive and negative signal groups are combined to obtain detection signals of the perturbation in said medium in one attitude, and
    signals from second set of positive and negative signal groups are combined to obtain detection signals of the perturbation in said medium in an attitude orthogonal to said first attitude.

15. The system as claimed in claim 8, wherein said surface area comprises a width and a length and the positive and negative signal groups included periodic and interleaved narrow strips extending along the width of the detector's surface area.

16. The system as claimed in claim 8, wherein the positive and negative signal groups comprise periodic and interleaved rectangular areas within the detector's surface area.

17. The system as claimed in claim 16, wherein two sets of positive and negative signal groups are affected, and wherein each set the positive and negative groups substantially occupy half of each four-periodic and interleaved areas within the detector's surface area;
    a first set of said positive and negative signal groups is formed with a straight boundary in said four-periodic and interleaved areas in a first attitude;
    a second set of said positive and negative signal groups is formed with a straight boundary essentially perpendicular to that of said straight boundary;
    signals from first set of positive and negative signal groups are combined to form a detection signal representing the perturbation in the medium in said first attitude, and
    signals from second set of positive and negative signal groups are combined to form a detection signal representing the perturbation in the medium in an attitude orthogonal to said first attitude.

18. The system as claimed in claim 8, wherein the photodetector elements are hard-wired according to predefined positive and negative signal groups.

19. The system as claimed in claim 8, wherein the photodetector elements are connected by a switchable array, enabling the positive and negative signal groups to be changed during the detection setup by means of an external control.

20. The system as claimed in claim 1, wherein a single array of photodetector elements is provided for receiving respective components of the probing beam redirected by said surface.

21. A method for detection of perturbations in a medium, comprising:
    generating and directing a probing beam on to a surface of a medium as in classical Knife Edge Technology;

sensing respective components of the probing beam redirected by said surface by respective photodetector elements;

perturbing the probing beam responsive to movement or disturbance of the medium so as to amplitude modulate respective components of the scattered beam received by each of the photodetector elements without needing to detect variations in either the phase or frequency of the scattered signal;

rectifying the respective components of the scattered beam received by each of the photodetector elements so as to generate respective rectified signals; and summing said rectified signals to produce an enhanced detection signal.

22. The method as claimed in claim 21, further comprising:
providing a switchable array of elements;
analyzing the signal of each element, and
searching for optimal positive and negative signal groupings.

23. The method as claimed in claim 21, wherein the photodetector elements are part of a single photodetector array.

* * * * *